(12) United States Patent
Mir Shafiei et al.

(10) Patent No.: US 10,261,260 B2
(45) Date of Patent: Apr. 16, 2019

(54) TUNABLE MICRORING RESONATOR

(71) Applicant: TELEFONAKTIEBOLAGET LM ERICSSON (PUBL), Stockholm (SE)

(72) Inventors: Mehrdad Mir Shafiei, Montreal (CA); Robert Brunner, Montreal (CA); Stephane Lessard, Mirabel (CA); Julie Dufort, Brossard (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/769,562

(22) PCT Filed: Dec. 11, 2015

(86) PCT No.: PCT/IB2015/059560
§ 371 (c)(1),
(2) Date: Apr. 19, 2018

(87) PCT Pub. No.: WO2017/098312
PCT Pub. Date: Jun. 15, 2017

(65) Prior Publication Data
US 2018/0306976 A1    Oct. 25, 2018

(51) Int. Cl.
*G02B 6/293*    (2006.01)
*G02B 6/35*    (2006.01)
*G02B 6/12*    (2006.01)

(52) U.S. Cl.
CPC ....... *G02B 6/2934* (2013.01); *G02B 6/12007* (2013.01); *G02B 6/3502* (2013.01); *G02B 6/3584* (2013.01)

(58) Field of Classification Search
None
See application file for complete search history.

(56) References Cited

U.S. PATENT DOCUMENTS 6,909,824 B1 *    6/2005    Messica ............ G02B 6/12007
                                                            385/15
2004/0081386 A1    4/2004    Morse et al.

FOREIGN PATENT DOCUMENTS

| JP | 2014-149507 A | 8/2014 |
| JP | 2015-135386 A | 7/2015 |
| WO | 02/082140 A1 | 10/2002 |

OTHER PUBLICATIONS

Dooyoung Hah et al., Mechanically tunable optical filters with a microring resonator, 2011 Optical Society of America, Applied Optics/vol. 50, No. 22, Aug. 1, 2011, pp. 4320-4327.
Taro Ikeda et al., A microelectromechanically tunable microring resonator composed of freestanding silicon photonic waveguide couplers, Applied Physics Letters 102, 221113 (2013), 6 pages.

(Continued)

*Primary Examiner* — Chad H Smith
(74) *Attorney, Agent, or Firm* — Julie Dufort, Ericsson Canada Inc.

(57) ABSTRACT

The disclosure relates to a tunable microring resonator, comprising a primary waveguide having first and second ends, a plurality of secondary waveguides each having a different length and each having first and second ends and a Micro-Electro-Mechanical System (MEMS) adjustable to optically couple at least a first end of the primary waveguide with a first respective end of a selected secondary waveguide thereby allowing light to circulate within the tunable microring resonator.

22 Claims, 16 Drawing Sheets

(56) References Cited

OTHER PUBLICATIONS

Taro Ikeda et al., Si Photonic Nano-Wire Tunable Micro-Ring Resonator Composed of Triply-Linked Variable Couplers, 2012 IEEE, MEMS 2012 Paris, France, pp. 660-663.
Yurii Vlasov et al., High-throughput silicon nanophotonic wavelength-insensitive switch for on-chip optical networks, 2008 Nature Publishing Group, Nature Photonics, vol. 2, Apr. 2008, pp. 242-246.
Adrea R. Johnson et al., Microresonator-based comb generation without an external laser source, 2014 Optical Society of America, Optics Express, vol. 22 , No. 2, pp. 1394-1401.
Julien Magne et al., All-fiber comb filter with tunable free spectral range, 2005 Optical Society of America, Optics Letters, vol. 30, No. 16, pp. 2062-2064.
Adrea R. Johnson et al., Chip-based frequency combs with sub-100 GHz repetition rates, 2012 Optical Society of America, Optics Letters, vol. 37, No. 5, pp. 875-877.
Patent Abstracts of Japan for 2015-135386, retrieved from https://www4.j-platpat.inpit.go.jp/eng/tokujitsu/tkbs_en/TKBS_EN_GM101_Top.action, 1 page.
Patent Abstracts of Japan for 2014-149507, retrieved from https://www4.j-platpat.inpit.go.jp/eng/tokujitsu/tkbs_en/TKBS_EN_GM101_Top.action, 1 page.
International Search Report from corresponding application PCT/IB2015/059560.

* cited by examiner

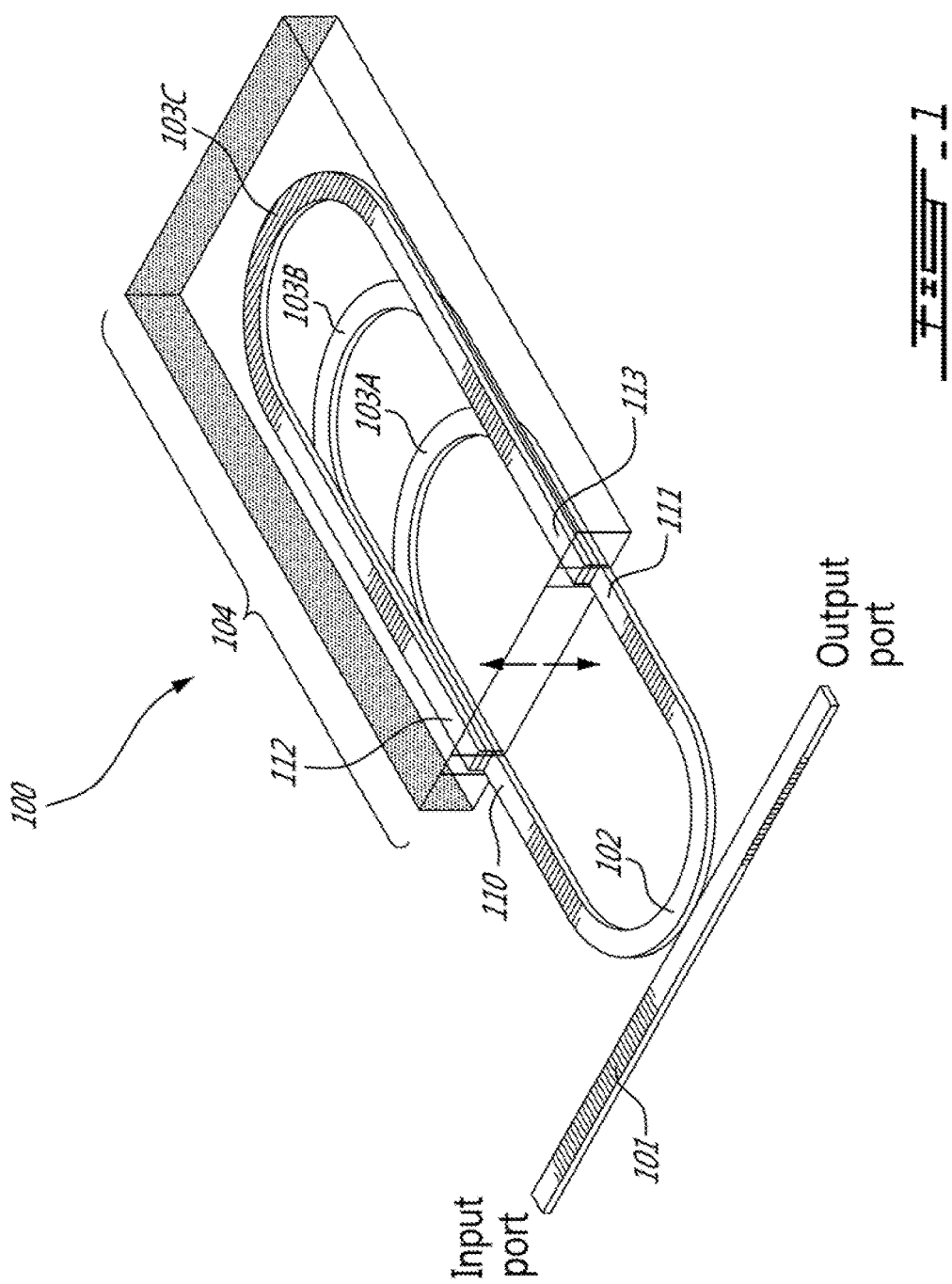

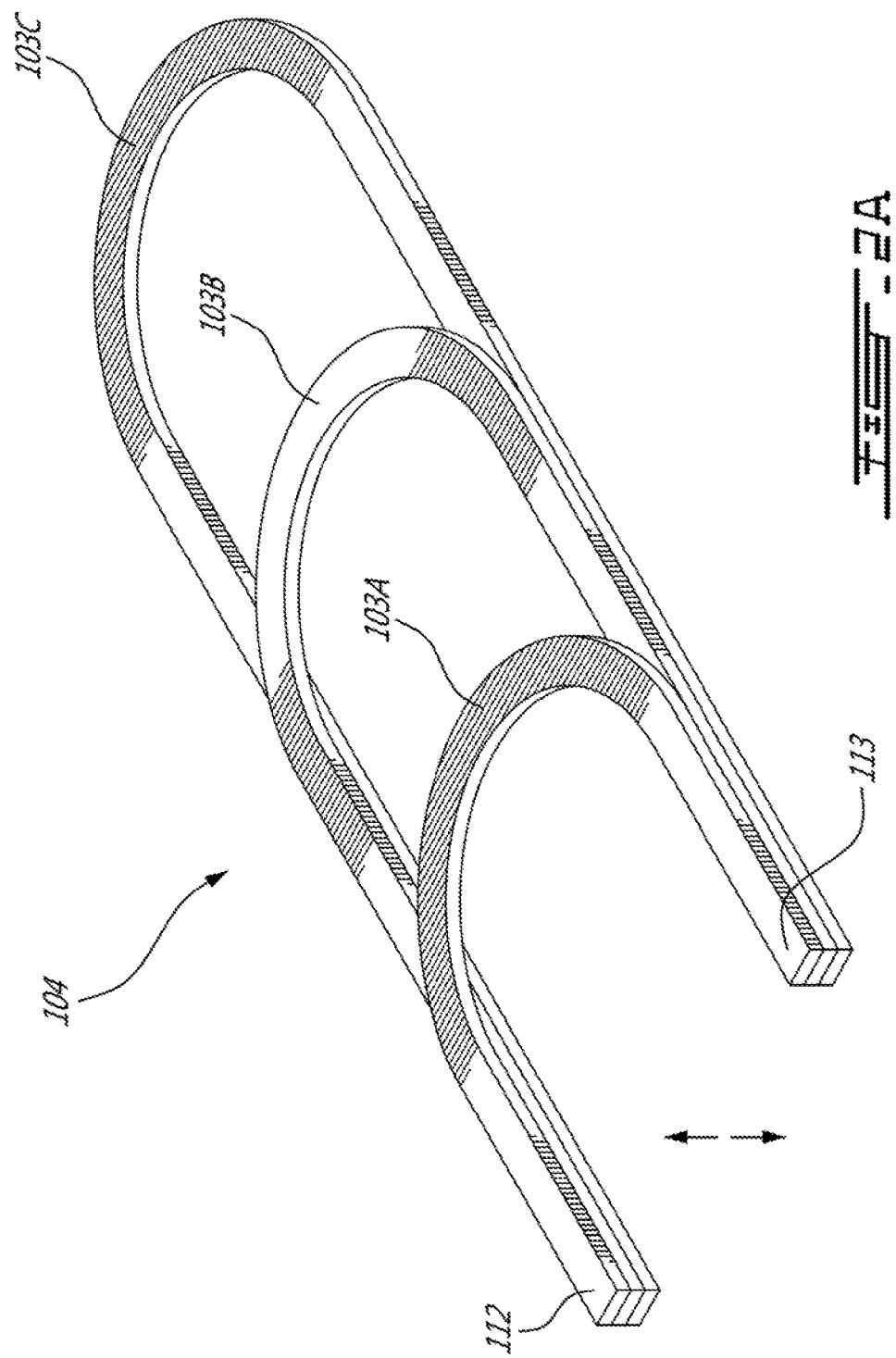

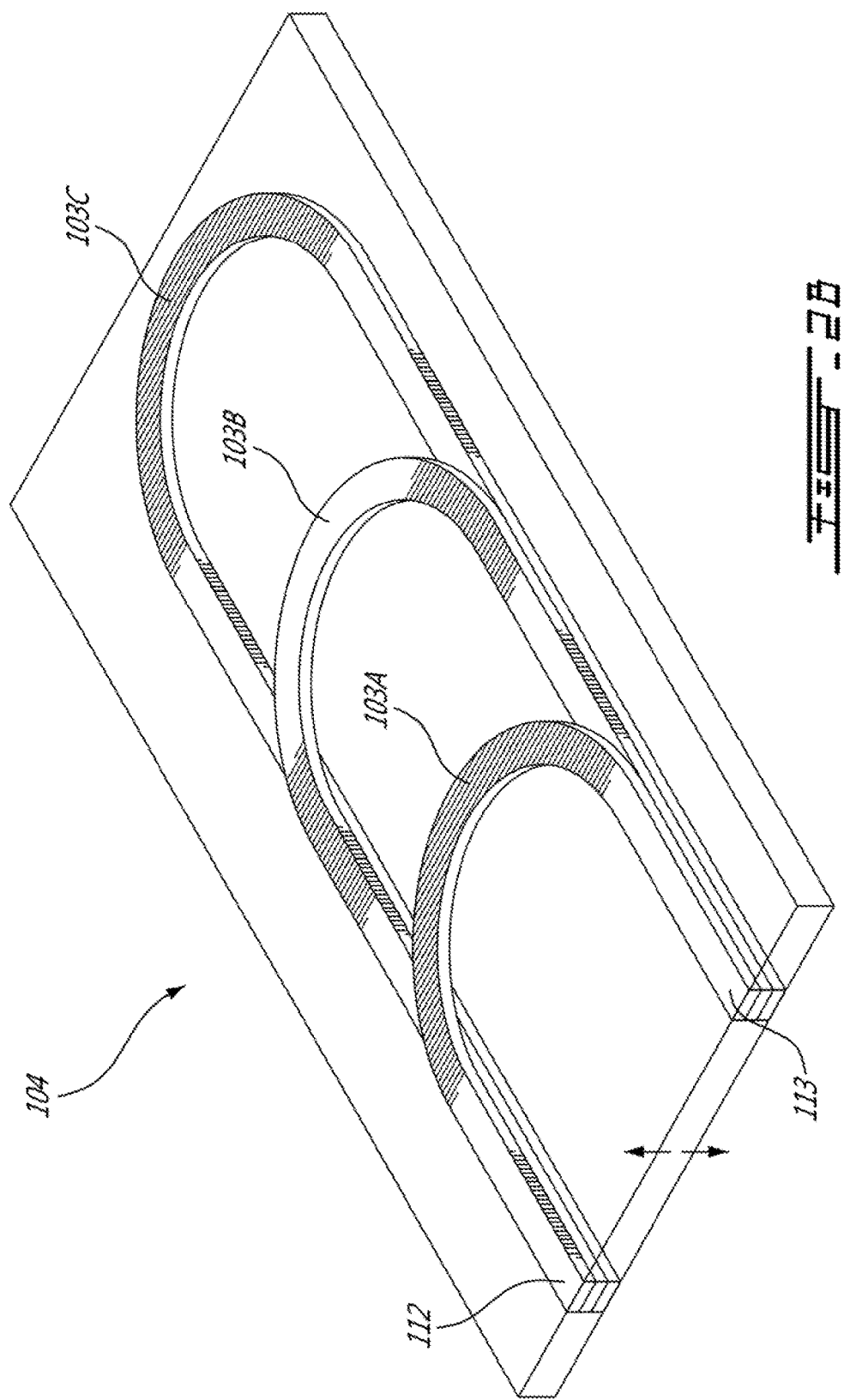

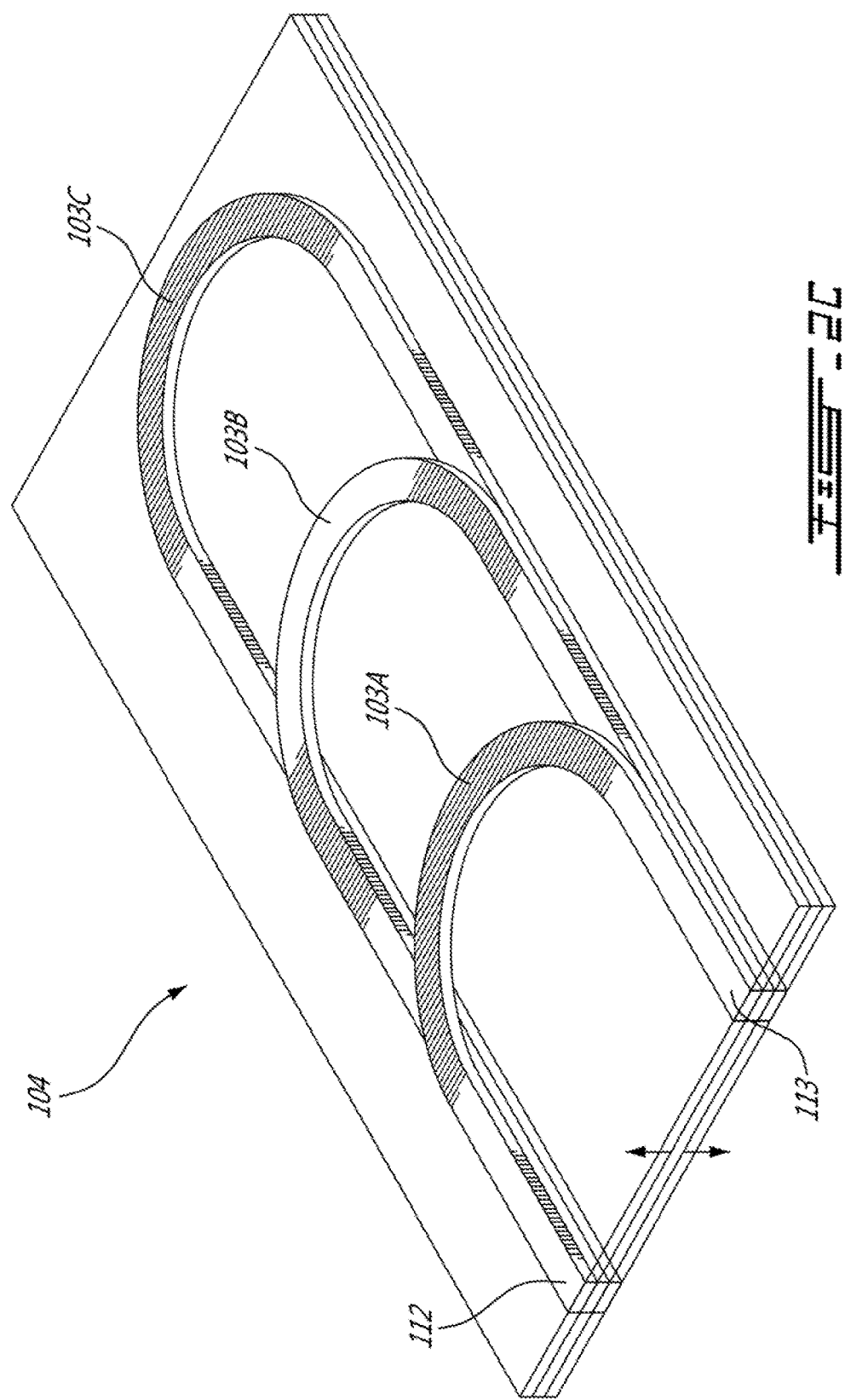

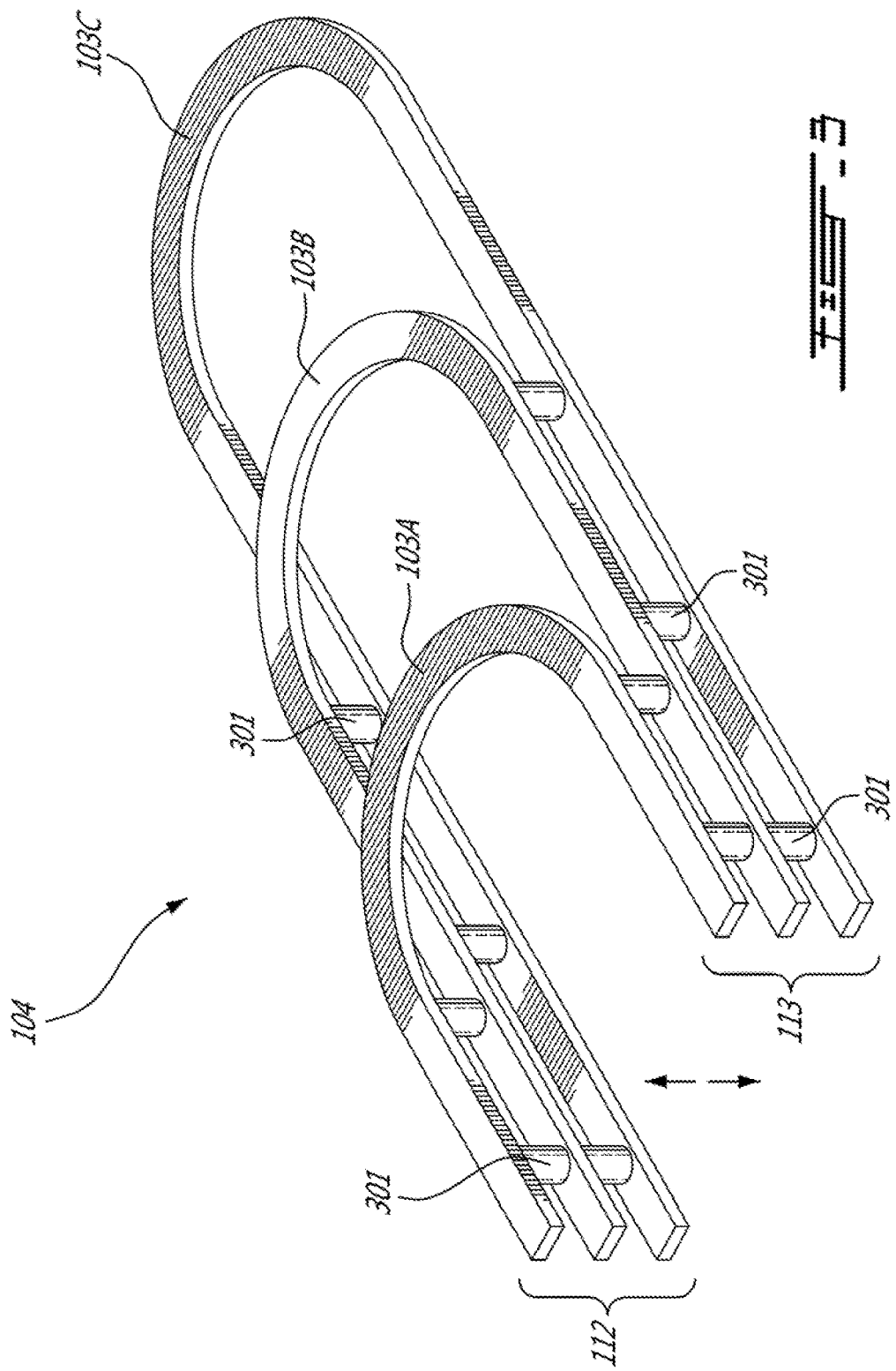

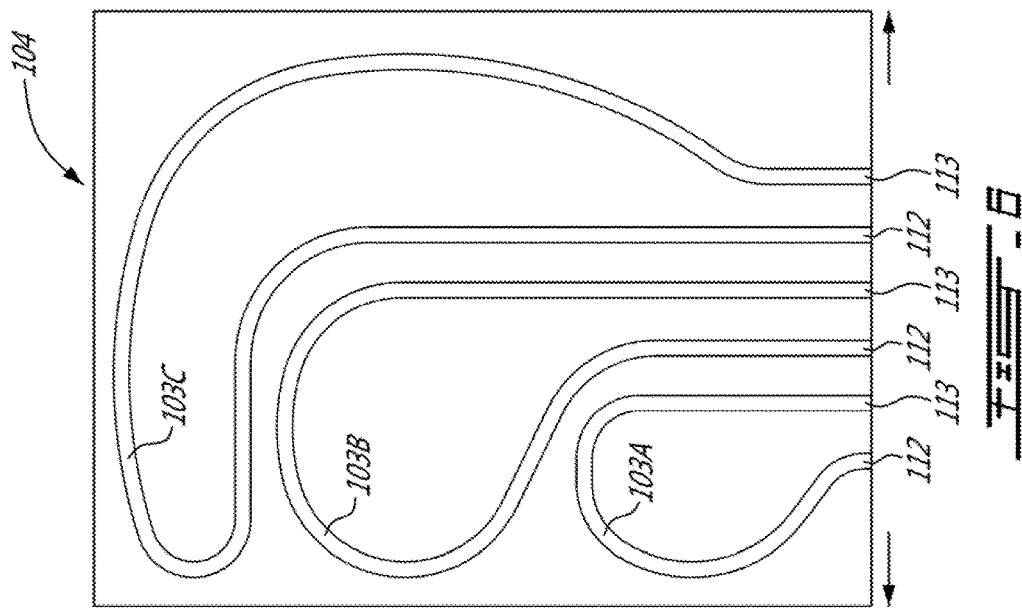
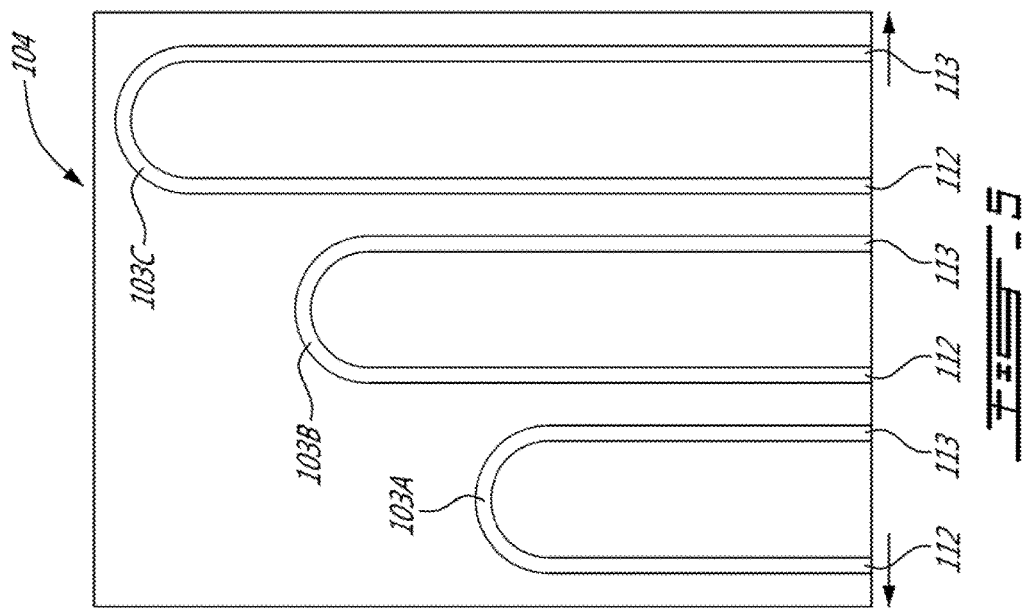

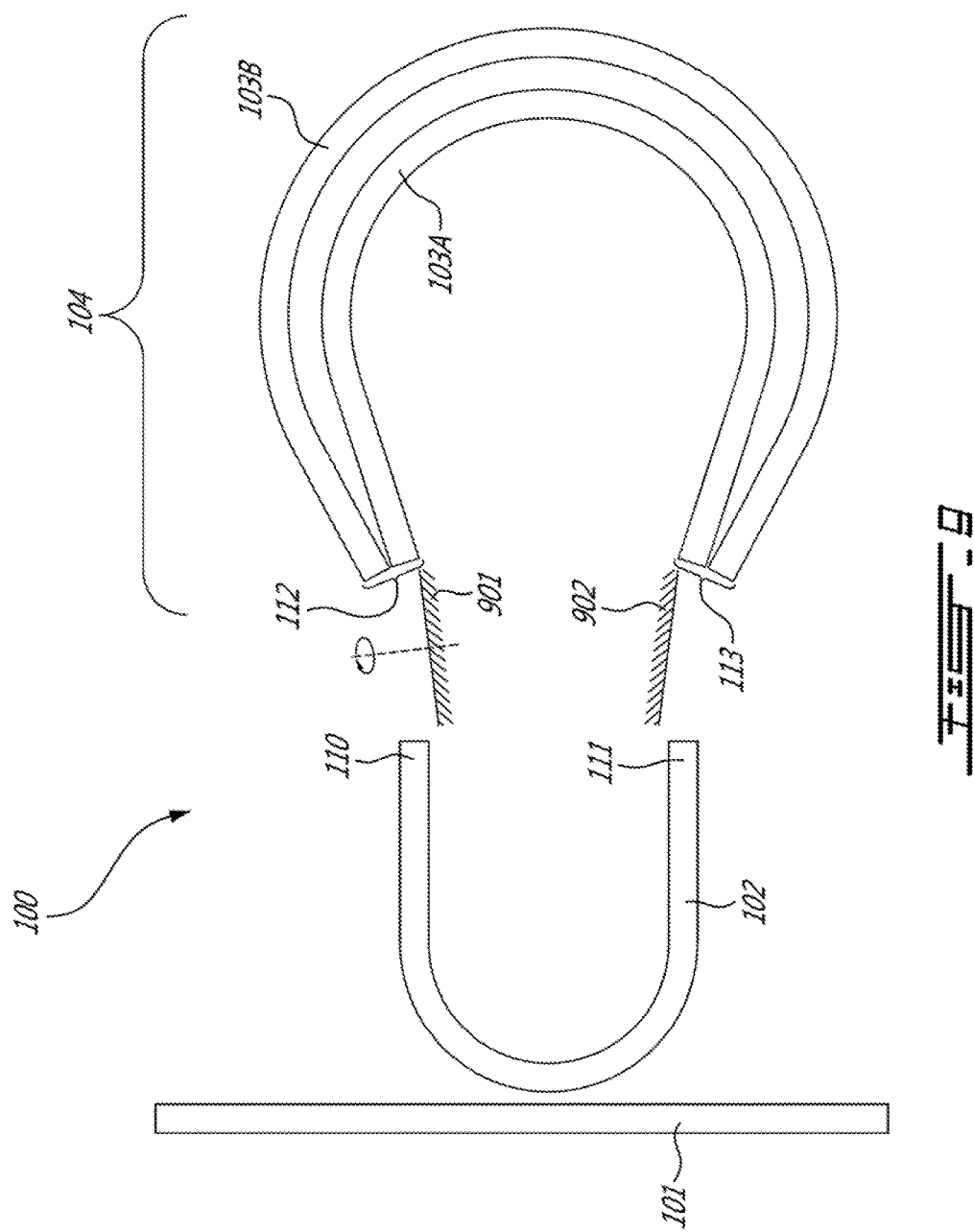

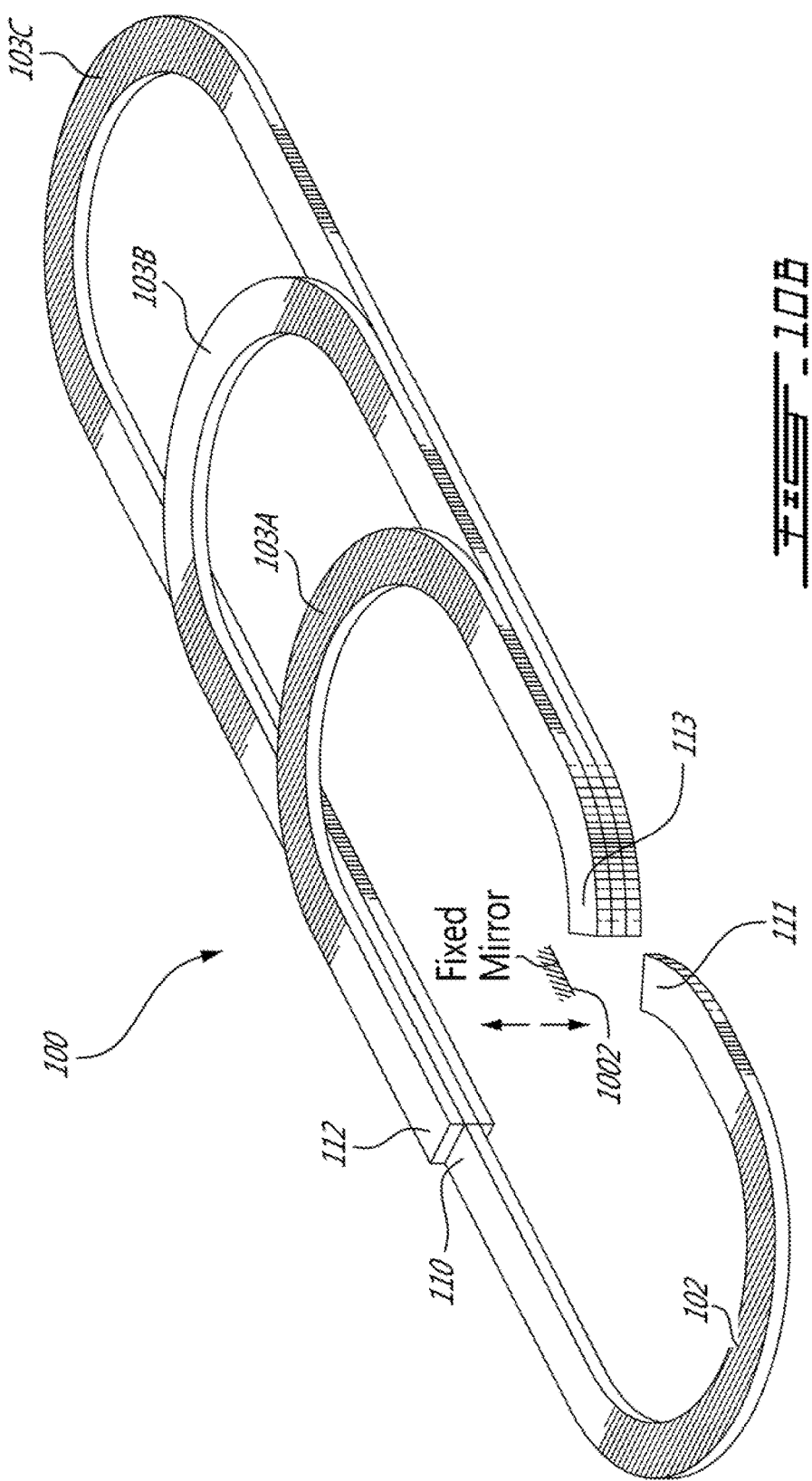

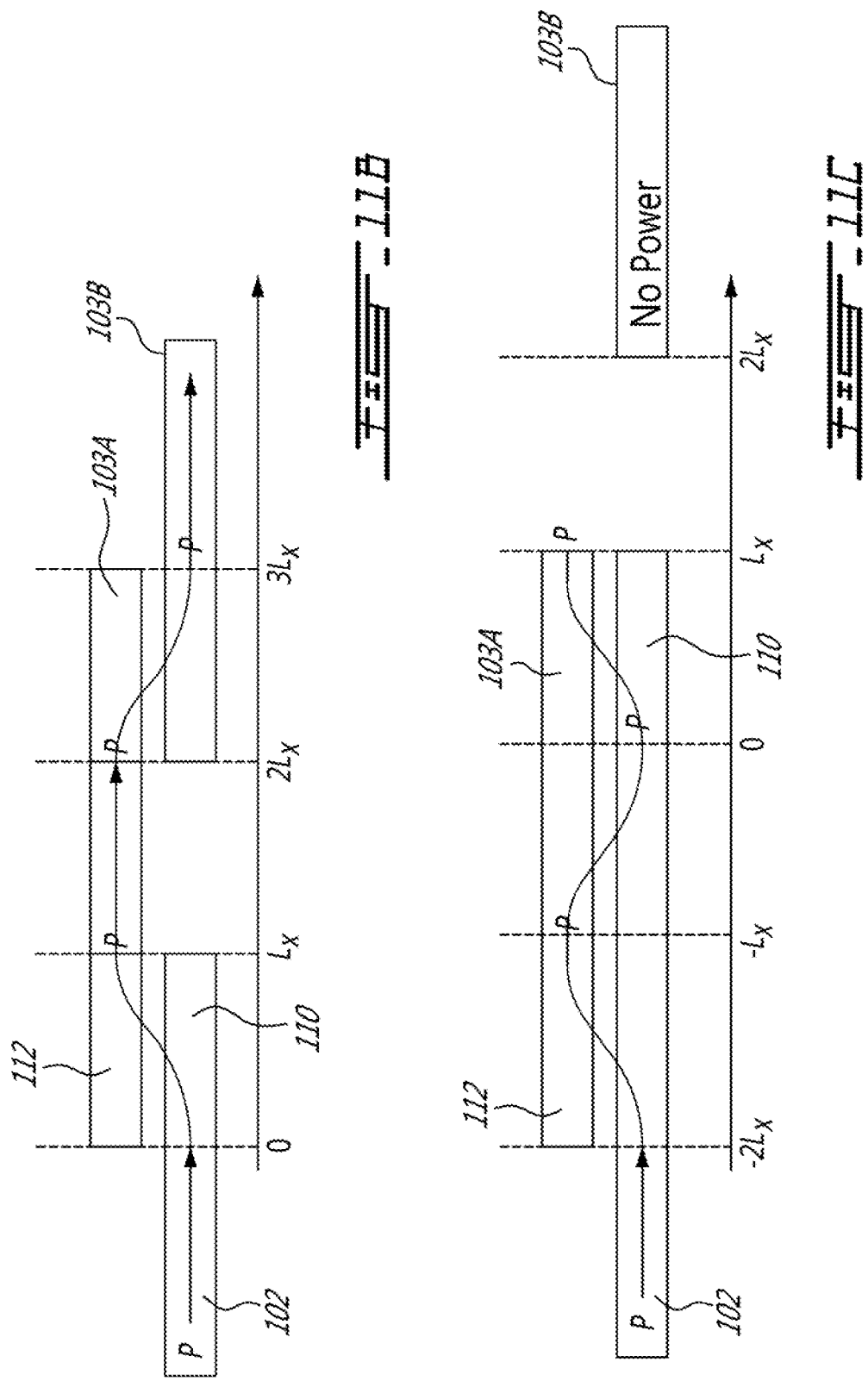

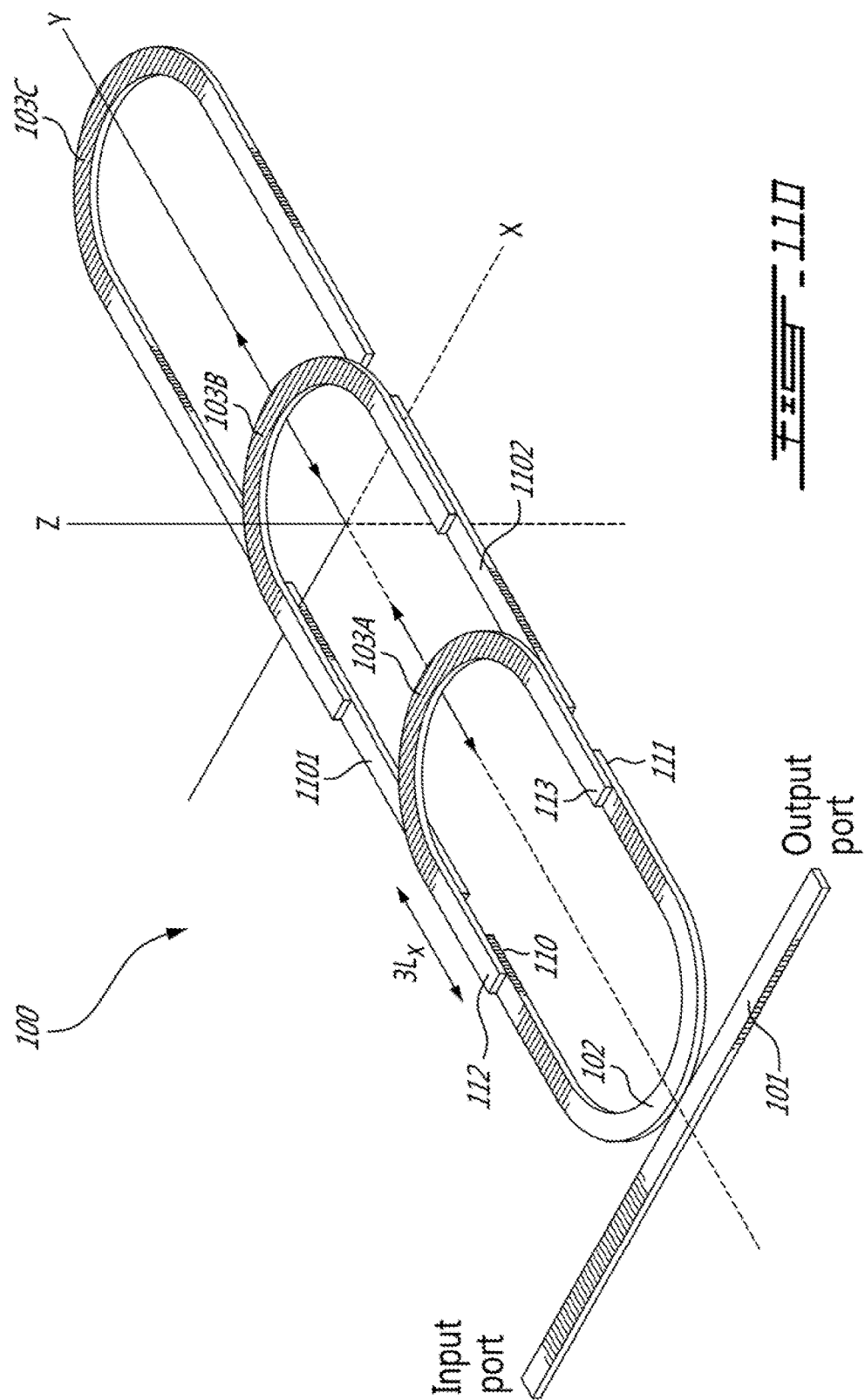

TUNABLE MICRORING RESONATOR

TECHNICAL FIELD

The present disclosure relates to a tunable microring resonator.

BACKGROUND

Optical filters are an essential part of today's optical networks. Multiwavelength filters can process several optical channels at the same time. Fabry-Perot interferometers and ring resonators are the most commonly used multiwavelength filters. Optical switches and electro-optical modulators based on ring resonators have been demonstrated in the literature. These filters have a constant free spectral range (FSR) because of invariable mechanical dimensions. FSR is defined as the wavelength spacing between two successive resonances in an interferometer.

Filters with tunable FSR provide more flexibility in the optical network. If needs of the network change, the filter can be tuned to new wavelengths. Future optical networks may use flexible grid where the channel spacing might change depending on the network conditions. In a data center if the traffic is high more wavelengths can be used to increase data transmission capacity. More wavelengths means filters and switches with smaller FSR are needed.

SUMMARY

There is provided a tunable microring resonator, comprising a primary waveguide having first and second ends, a plurality of secondary waveguides each having a different length and each having first and second ends and a Micro-Electro-Mechanical System (MEMS) adjustable to optically couple at least a first end of the primary waveguide with a first respective end of a selected secondary waveguide thereby allowing light to circulate within the tunable microring resonator.

There is also provided a method of operating a tunable microring resonator, comprising sending a signal to a Micro-Electro-Mechanical System (MEMS) to induce, by mechanical movement, the optical coupling of at least a first end of a primary waveguide with a first end of a selected secondary waveguide, selected among a plurality of secondary waveguides each having a different length, such that light can circulate within the tunable microring resonator.

BRIEF DESCRIPTION OF THE DRAWINGS

FIG. 1 is a perspective view of a first embodiment.

FIG. 2A is a perspective view of a variant of the secondary waveguides of the first embodiment.

FIG. 2B is a perspective view of a variant of the secondary waveguides of the first embodiment.

FIG. 2C is a perspective view of a variant of the secondary waveguides of the first embodiment.

FIG. 3 is a perspective view of a variant of the secondary waveguides of the first embodiment.

FIG. 5 is a top view of a variant of the secondary waveguides of the first embodiment.

FIG. 6 is a top view of a variant of the secondary waveguides of the first embodiment.

FIG. 9 is a top view of a second embodiment.

FIG. 10B is a perspective view of a fourth embodiment.

FIG. 11B is a side view of the fifth embodiment of FIG. 11A, where a secondary waveguide partially overlaps with the primary waveguide and with another secondary waveguide.

FIG. 11C is a side view of the fifth embodiment, where a secondary waveguide partially overlaps with the primary waveguide only.

FIG. 11D is a perspective view of a variant of the fifth embodiment.

DETAILED DESCRIPTION

Figure 4:
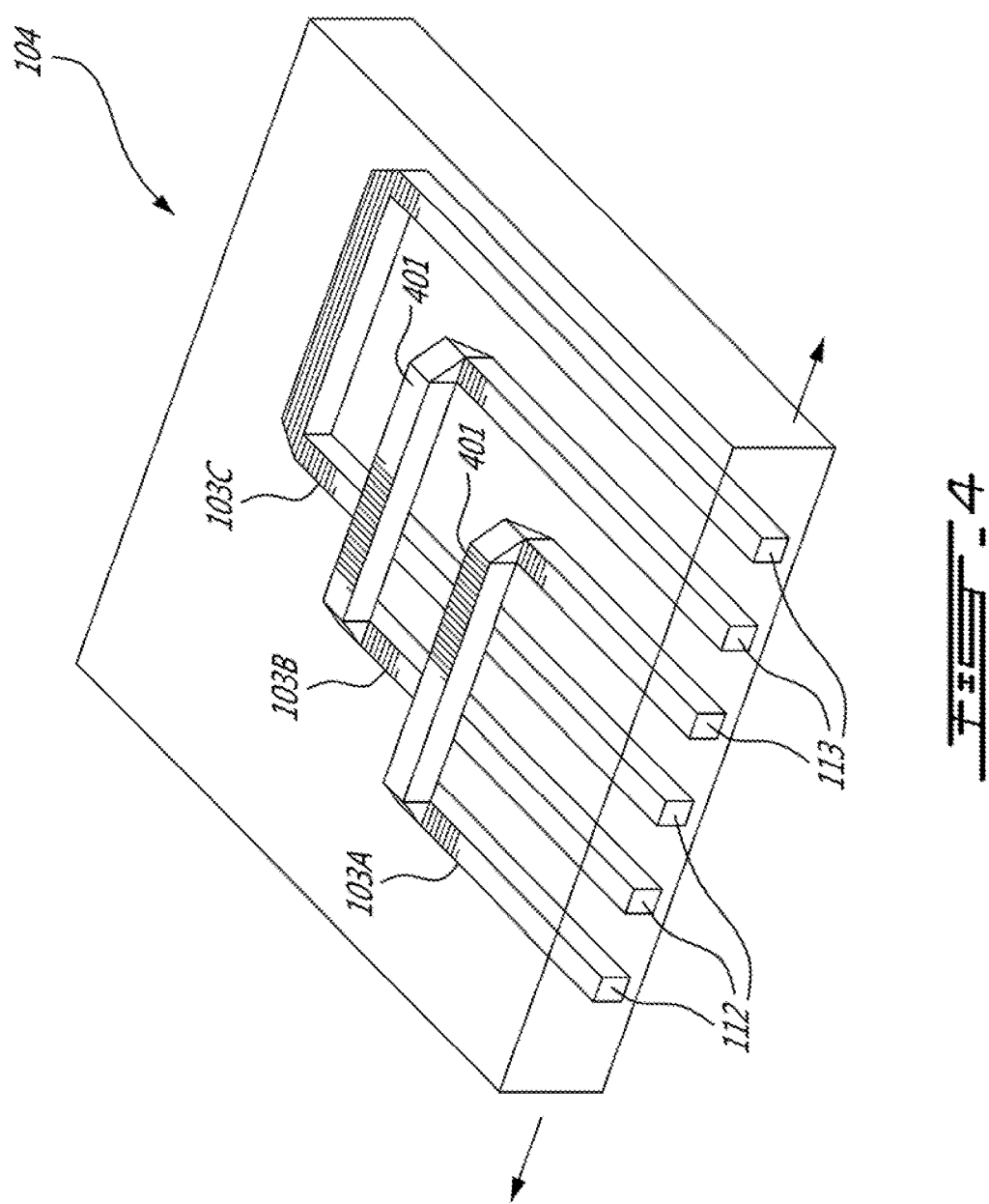
FIG. 4 is a perspective view of a variant of the secondary waveguides of the first embodiment.

Various features will now be described with reference to the figures. These various aspects are described hereafter in greater detail in connection with exemplary embodiments and examples, and should not be construed as limited to these embodiments. Rather, these embodiments are provided so that the disclosure will be thorough and complete.

Some aspects will be described in terms of sequences of actions or functions. It should be recognized that in some embodiments, some functions or actions could be performed by specialized circuits, by program instructions being executed by one or more processors, or by a combination of both.

A typical ring resonator has an invariable size and therefore a constant free spectral range (FSR). A microring has previously been described in [Johnson, A. R., Okawachi, Y., Levy, J. S., Cardenas, J., Saha, K., Lipson, M., & Gaeta, A. L., "Chip-based frequency combs with sub-100 GHz repetition rates," Optics letters, 37(5), 875-877, 2012] which generated a frequency comb by four-wave mixing in a parametric process. Three different rings where fabricated to achieve comb sources with FSRs of 80, 40, and 20 GHz.

Embodiments described below provide a ring resonator with tunable FSR that can replace these three devices to produce a tunable frequency comb. The embodiments below use Micro-Electro-Mechanical system (MEMS) technology for a compact, integrated solution and to allow broad tuning of the FSR.

An optical filter with tunable FSR has several applications and permits a network architect to design more flexible networks. The existing solutions to make optical filters with tunable FSR are based on fiber Bragg grating (FBG), such as described in [Julien Magné, Philippe Giaccari, Sophie LaRochelle, José Azaña, and Lawrence R. Chen, "All-fiber comb filter with tunable free spectral range," Opt. Lett. 30, 2062-2064 (2005)]. The tuning range in this existing technology is limited to small amounts.

Some of the integrated circuits based on ring resonators can benefit from having a tunable FSR. A ring-based wavelength-division multiplexing (WDM) optical switch or a frequency comb source are among the structures that can show improved functionality by employing a filter with tunable FSR. The embodiments below present novel microring resonators using MEMS with broad FSR tunability.

Ring resonators are commonly used elements in integrated optical circuits, particularly in silicon photonics. They are widely used as electro-optical modulators, comb lasers, multiplexers, demultiplexers, filters, delay lines, etc. The frequency spacing between two adjacent resonances is called an FSR. The FSR depends on the wavelength ($\lambda$), the group index ($n_g$), and the ring size (L) as indicated in (1).

$$FSR = \frac{\lambda^2}{n_g \cdot L} \quad (1)$$

A ring resonator has a constant FSR at a given wavelength since the dimensions of the ring are unchangeable. A FSR can be tuned by controlling of the distance that light travels inside the ring.

In the embodiments that will be described below, a MEMS structure is introduced in a ring resonator to achieve a multiwavelength optical filter with a broadly tunable FSR. The FSR can be tuned to several discrete and pre-defined wavelength spacings by changing the microring cavity length.

As shown in FIG. 1, the ring resonator 100 is divided into two segments 102, 103. The first segment 102 couples light to the I/O bus 101 and the second segment 103A, 103B or 103C (generally 103), chosen from a set of waveguides 104 with different lengths, completes the microring 100. The segments 103 lengths can be calculated based on the required FSRs, e.g. 50, 100, 200 or 400 GHz. The movement provided by the MEMS structure (not illustrated) selects a second ring segment 103 to achieve a desired FSR.

It should be noted here that even though the embodiments described show two or three secondary segments, more segments could be available in the microring.

In some embodiment (e.g. FIGS. 1-8), the segments 103 are moved either vertically or horizontally to change the cavity length and therefore tune the microring FSR. The actuator moves only in one direction (one degree of freedom of motion).

In another embodiment (FIG. 9), two MEMS mirrors 901, 902 are used to transfer light between the segments 102, 103. The waveguide lengths are designed to achieve target FSRs. The mirror rotation provides selectivity between waveguides. The actuators move only in one direction (one degree of freedom of motion). This reduces significantly the complexity compared to 3D MEMS mirrors.

In other embodiments (FIG. 10), segments 103 fixed (FIG. 10A) or movable (FIG. 10B) are used in combination with a movable 1001 or fixed 1002 mirror to change the cavity length and therefore tune the microring FSR.

In another embodiment (FIG. 11), directional couplers are used to modify the microring perimeter and tune the FSR.

These embodiments provide a microring resonator filter in which the FSR is tunable over a broad range among a set of discrete and pre-defined values. It provides such adjustability using simple MEMS movement in one direction or by in-plane rotation of mirror(s).

FIG. 1 illustrates a first embodiment of a tunable microring resonator 100, comprising a primary waveguide 102 having a first end 110 and a second end 111. The microring resonator also comprises a plurality of secondary waveguides 103 each having a different length and each having a first end 112 and a second end 113. The microring resonator comprises a Micro-Electro-Mechanical System (MEMS) (not illustrated) adjustable to optically couple at least the first end 110 of the primary waveguide with a first respective end 112 of a selected secondary waveguide 103A in FIG. 1 thereby allowing light to circulate within the tunable microring resonator.

In the tunable microring resonator, the plurality of secondary waveguides 103 are moved by the MEMS as a single element and the MEMS optically couples the second end 111 of the primary waveguide with a second respective end 113 of the selected secondary waveguide (103A in FIG. 1).

The number of FSR possibilities shown in FIG. 1 is equal to the number of segments, which have pre-calculated lengths based on target FSR values. Segments are vertically stacked with a distance that ensures no cross-talk. Crosstalk depends on waveguide material; for silicon waveguides a 3 um distance is enough to avoid crosstalk. The MEMS structure vertically moves the whole block containing the segments.

The two parts 102 and 103 of the microring are edge coupled. There is a very small gap and tapers are used at waveguide endings to reduce optical losses caused by the discontinuity at the gap. We define this type of coupling as an abutting relation. A person skilled in the art would understand that abutting would comprise slightly different arrangements providing similar levels of coupling.

FIGS. 2A to 2C illustrate variants for the set of secondary waveguides 104 of the first embodiment. As can be seen, the waveguides can be made of Si or $Si_3N_4$. A $SiO_2$ or air cladding may surround the waveguide and the waveguides may be built on a substrate of $SiO_2$, such as illustrated in FIG. 2B. Alternatively, the secondary waveguides may be laser inscribed inside a glass or polymer substrate.

As another alternative, the secondary waveguides may be built in layers deposited on top of each other, as illustrated in FIG. 2C.

In FIGS. 1-3 and 10B, the secondary waveguides are stacked vertically, on top of each other, and may be moved by 1D MEMS according to a translation movement along a vertical axis. The 1D MEMS device can move this set of waveguides to achieve the target FSR by selecting and aligning a waveguide with an appropriate size. In these embodiments, the first 110 and second 111 ends of the primary waveguide are aligned to abut, as defined previously, respective first 112 and respective second 113 ends of the selected secondary waveguide.

FIG. 3 illustrates a variant of the secondary waveguides of the first embodiment where the secondary waveguides are spaced apart by spacers 301. The spacers may have a height of a few micrometers and be made of any material that does not conduct wavelengths such as those circulated in microring resonators.

FIG. 4 illustrates another variant of the secondary waveguides of the first embodiment where the secondary waveguides are intertwined and comprise at least one bridge 401. The waveguide bridges can be designed like a periscope, with 45 degree facets that permit tight bending of light.

FIGS. 5 and 6 illustrate other variants of the secondary waveguides of the first embodiment, where the secondary waveguides are juxtaposed on a substrate and are moved by the MEMS according to a translation movement along a horizontal axis.

As can be seen on these figures, the secondary waveguides can be U shaped or can have a free form. Further, the embodiment of FIG. 6 allows for a smaller gap between the first ends 112 and the second ends 113.

As illustrated at least in FIGS. 1-2, 4, 7 and 8, the secondary waveguides can be juxtaposed inside a substrate.

Figure 7A:
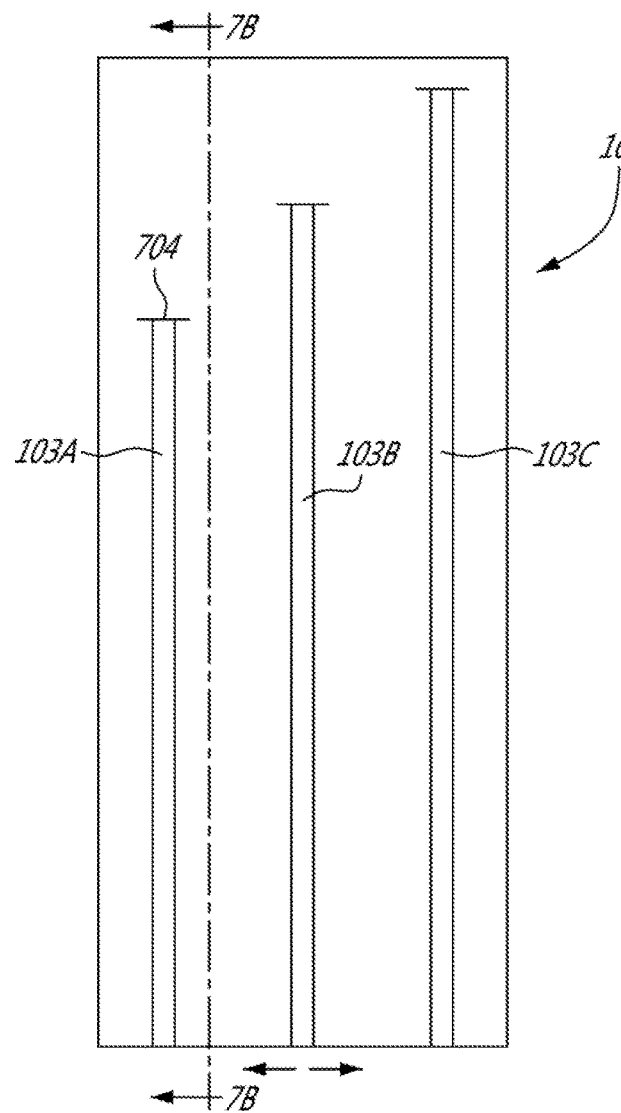
FIG. 7A is a top view of a variant of the secondary waveguides of the first embodiment.
Figure 7B:
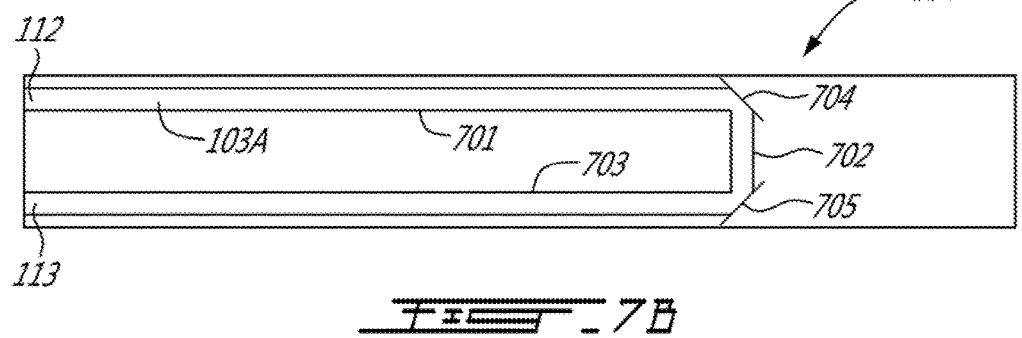
FIG. 7B is a side view along line A-A of FIG. 7A.
Figures 8A, 8B:
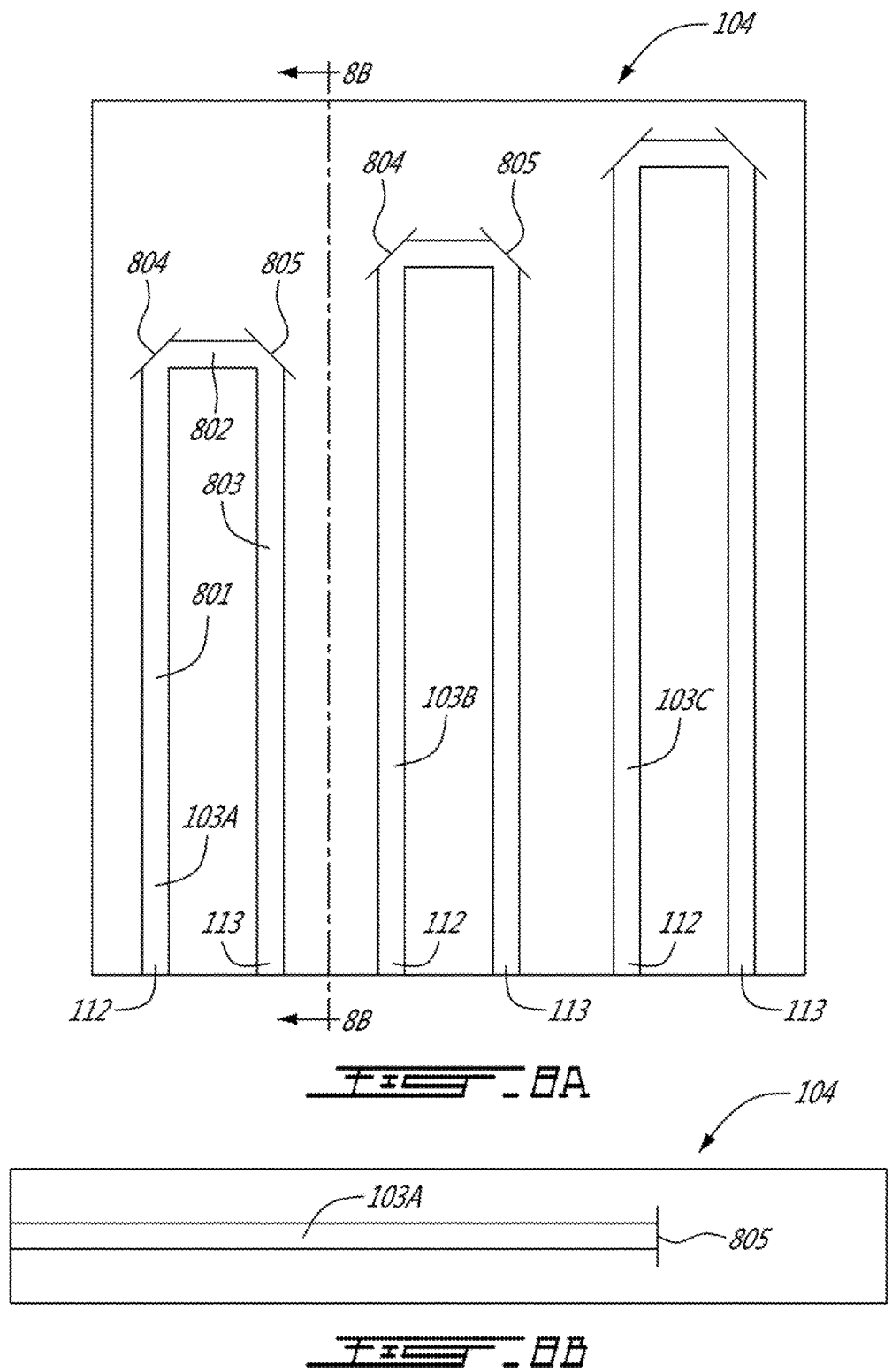
FIG. 8A is a top view of a variant of the secondary waveguides of the first embodiment.
FIG. 8B is a side view along line B-B of FIG. 8A.

In some embodiments, such as those of FIGS. 4, 7 and 8, the secondary waveguides can be moved by the MEMS according to a translation movement along a horizontal axis.

In FIGS. 7 and 8, the secondary waveguides comprise a plurality of segments 701, 702, 703, 801, 802, 803 and a plurality of mirrors 704, 705, 804, 805 for reflecting light therein.

Turning to FIG. 9, there is provided a second embodiment of a structure to tune the FSR of a ring resonator, where MEMS activated mirrors projects or redirect light into the selected waveguide by in-plane rotation.

In this embodiment, the ring is split into two segments 102 and 103. Two MEMS mirrors 901 and 902 are used to transfer the light between the two segments 102 and 103. The first MEMS is adjustable to optically couple the first end 110 of the primary waveguide with a first respective end 112 of the selected secondary waveguide. The second MEMS is adjustable to optically couple the second end 111 of the primary waveguide with a second respective end 113 of the selected secondary waveguide.

More specifically, the MEMS are operative to rotate mirrors to redirect the light coming from the first end 110 of the primary waveguide towards the first end 112 of the selected secondary waveguide and to redirect the light coming from the second end 113 of the selected secondary waveguide towards the second end 111 of the primary waveguide.

The input/output bus 101 is coupled to the first segment 102 of the microring 100. The second segment 103 of the microring 100 can be chosen among a set of waveguides 104 with different lengths. The length of these waveguides is calculated to achieve target FSR values, where the number of possible FSRs is equal to the number of waveguides 103. Typical wavelength spacing for WDM applications are 50, 100 and 400 GHz. The MEMS actuator rotates the mirrors 901, 902 in 2D to select a target waveguide. It is possible to control both mirror actuators (not illustrated) by one electrical signal with a symmetrical design of waveguides and mirrors.

Light should be transferred between the two segments with high efficiency to avoid optical losses. Loss limits the quality-factor and finesse of the microring filter response. The waveguides can be tapered or collimating lenses may be used to transfer light efficiently between the two segments. The mirrors can also be concave to focus the light from and into the waveguides 102, 103.

Figure 10A:
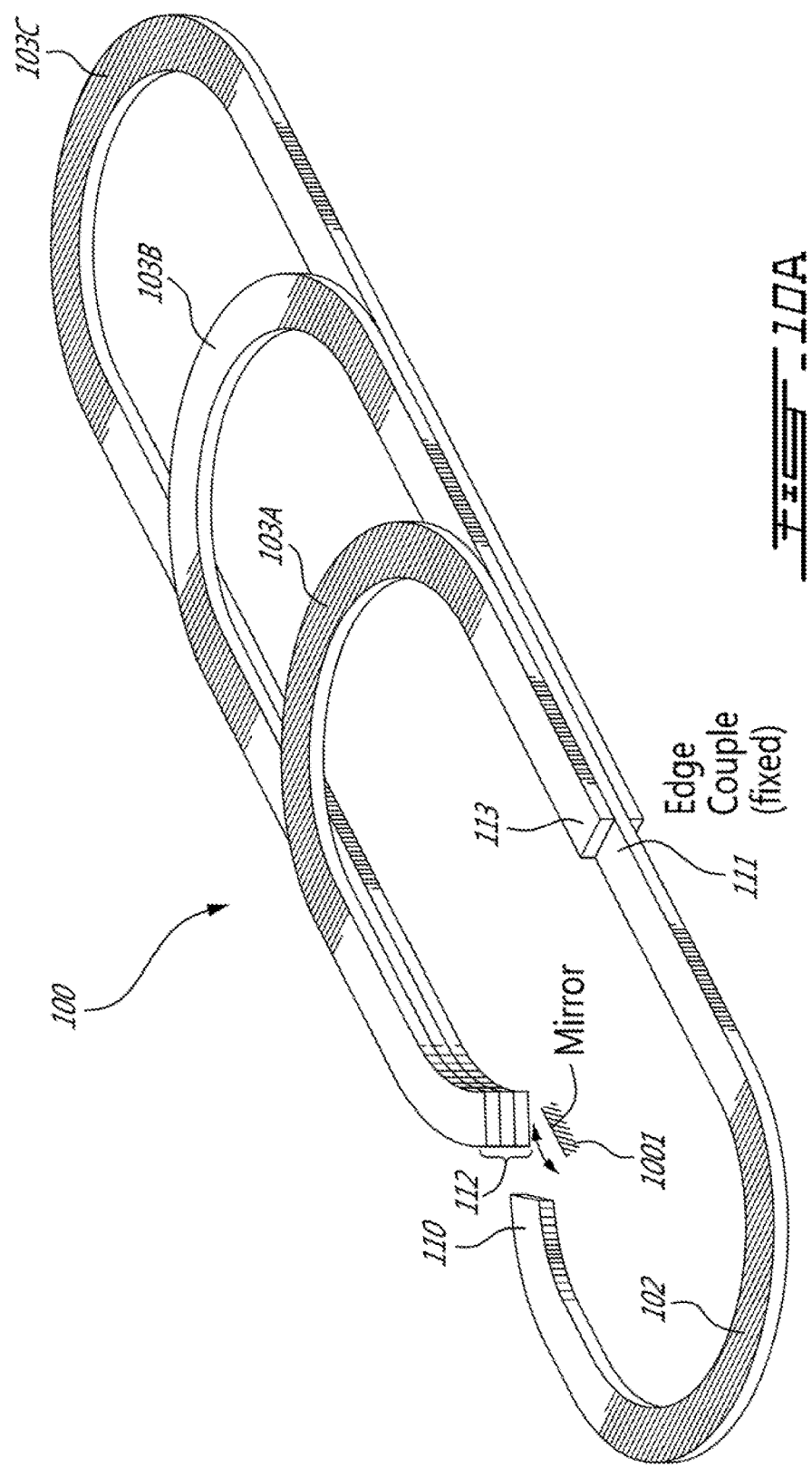
FIG. 10A is a perspective view of a third embodiment.

FIG. 10A illustrates a third embodiment where the MEMS is adjustable to rotate a mirror 1001 to redirect the light coming from the first end 110 of the primary waveguide towards the first end 112 of the selected secondary waveguide. In this embodiment, the second end 111 of the primary waveguide is edge coupled to the second end 113 of the selected secondary waveguide in a fixed manner.

The first waveguide may further form a single continuous waveguide with one of the secondary waveguides located e.g. in-between other secondary waveguides. For example, in FIG. 10A, the waveguides 102 and 103B could be, in fact, a single continuous waveguide and at the end 113, the waveguides 103A and 103B could be edge coupled and the waveguides 103B and 103C could also be edge coupled, to allow the light to jump from one waveguide to another depending on which secondary waveguide is selected by the mirror 1001.

FIG. 10B illustrates a fourth embodiment where the MEMS is adjustable to edge couple the first end 110 of the primary waveguide to the first end 112 of the selected secondary waveguide 103B. The first end 110 of the primary waveguide 102 abut the first end 112 of the selected secondary waveguides 103B. A fixed mirror 1002 is operative or used to redirect the light coming from the second end 113 of the selected secondary waveguide towards the second end 111 of the primary waveguide.

Figure 11A:
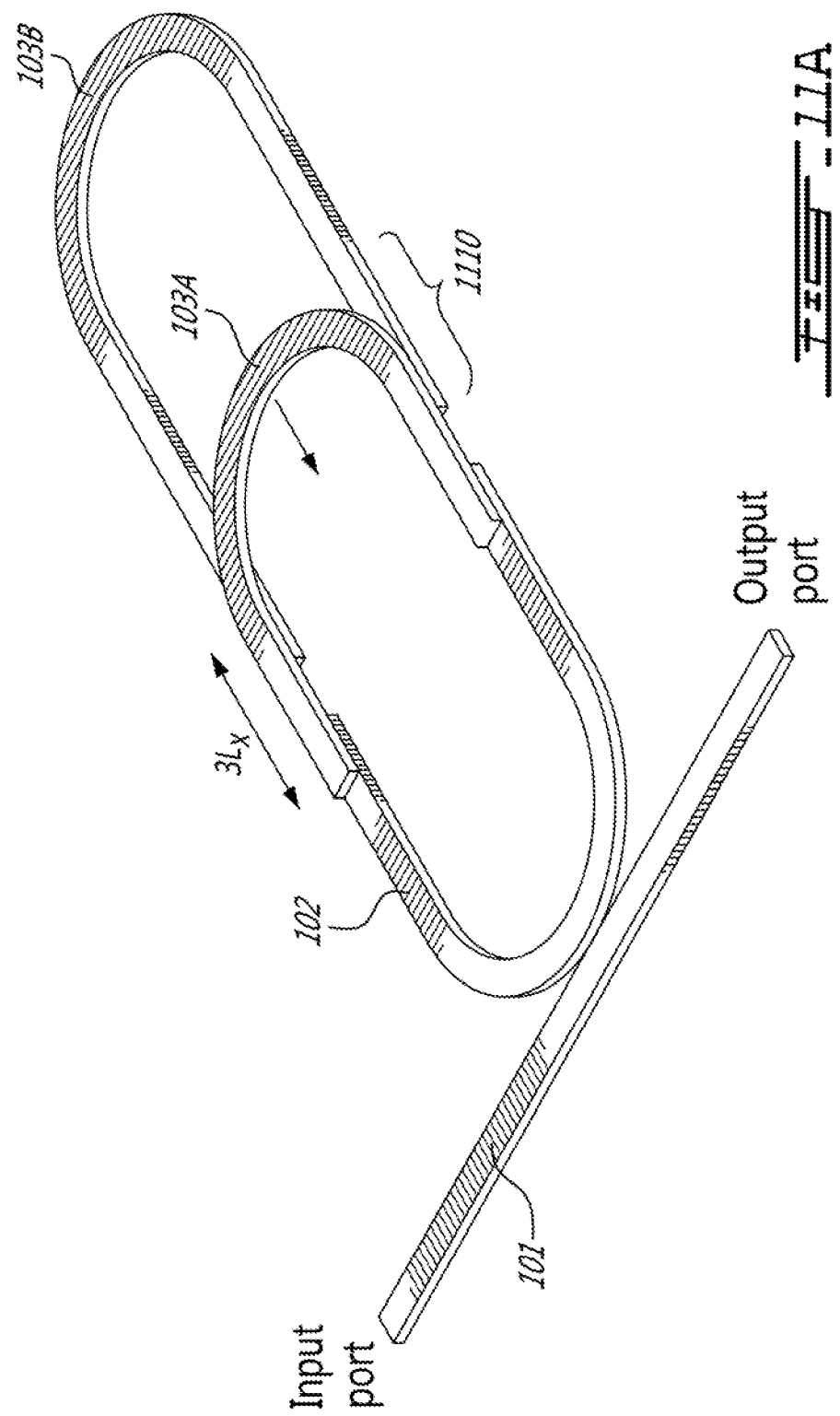
FIG. 11A is a perspective view of a fifth embodiment.

FIG. 11A illustrates a fifth embodiment of a ring resonator which is segmented in a plurality of segments 102, 103 to tune the FSR. In this simplified embodiment, there are provided two movable arms 103A and 103B that allows providing two possible FSR values.

The secondary waveguides 103A, 103B, each have a portion 1110 operative to overlap with a portion 1110 of the other secondary waveguide. At least one of the secondary waveguides 103A is movable between a first position where it partially overlaps with the primary waveguide 102 only and a second position where it partially overlaps with the primary waveguide 102 and the other secondary waveguide 103B, as illustrated in FIG. 11A.

FIG. 11B illustrates a side view of the fifth embodiment of FIG. 11A, where the secondary waveguide 103A partially overlaps with the primary waveguide 102 and partially overlaps with the other secondary waveguide 103B. In this case, light is coupled between waveguide 102 and waveguide 103A and again between waveguide 103A and waveguide 103B. The ring circumference is extended all the way into the waveguide 103B, forming a longer loop. The arrows schematically show the optical power (P) path.

FIG. 11C illustrates a side view of the fifth embodiment, where the secondary waveguide 103A partially overlaps with the primary waveguide 102 only. In this case, light is coupled between waveguide 102 and waveguide 103A only and the ring loop is completed, forming the smallest loop. The MEMS is used to move the segment 103A between one position and the other.

Microring segments 102, 103B are spaced by the crossover length Lx, defined as the length required to fully couple light from a waveguide to an adjacent waveguide. The movable U-shaped arm 103A is in another plane above or below the microring segments at close proximity to the fixed part to form a vertical directional coupler. The coupling section length of the movable segment is 3Lx.

The MEMS structure moves the segment 103A in one dimension by a fixed amount (2Lx) which allows for simple and precise MEMS design. The movable waveguides with one degree of motion can be mechanically latched in the actuated state, and remain persistent in this state even if electrical power is removed from the device.

In FIG. 11B the movable arm acts as a transitional waveguide to extend the microring circumference for obtaining smaller FSRs. Light is coupled to the MEMS arm by moving the MEMS arm by 2Lx (FIG. 11C). In this position light is coupled to the movable arm and loops back to complete the microring perimeter. The "actuator" state being binary permits a simple "single wire" control interface (ON/OFF). The control interface for the array of actuators can be implemented as a "one-bit" shift register & latch circuit per cell that are cascaded together to form a long shift register.

Since the directional coupler operates at 100% coupling, the total loss inside the ring is comparable to a typical microring although fabrication errors can limit the Q-factor and finesse of the segmented ring.

FIG. 11D illustrates a variant for a segmented microring with tunable FSR. The number of FSR possibilities is equal to the number of segments 103 and 1101, 1102. The microring of FIG. 11D operates in a manner similar as described above. However, one MEMS can move a plurality of segments 103A, 103B or a plurality of MEMS can be used to move the segments 103A, 103B.

Figure 12:
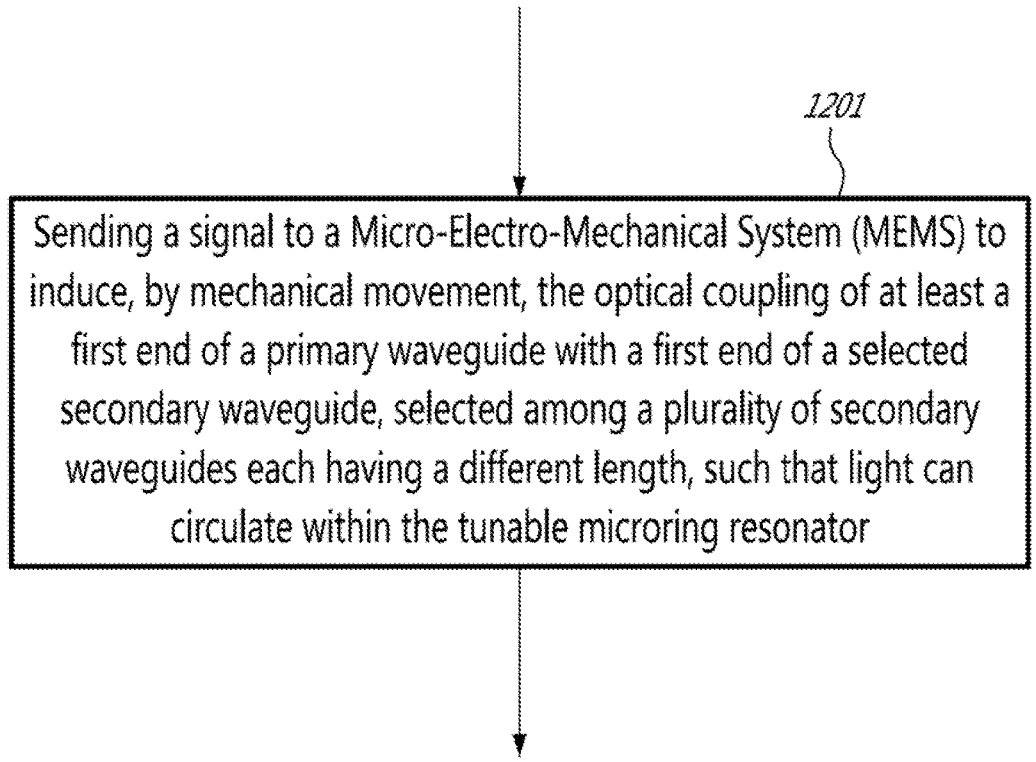
FIG. 12 is a flowchart illustrating a method of operation according to an embodiment.
Figure 13:
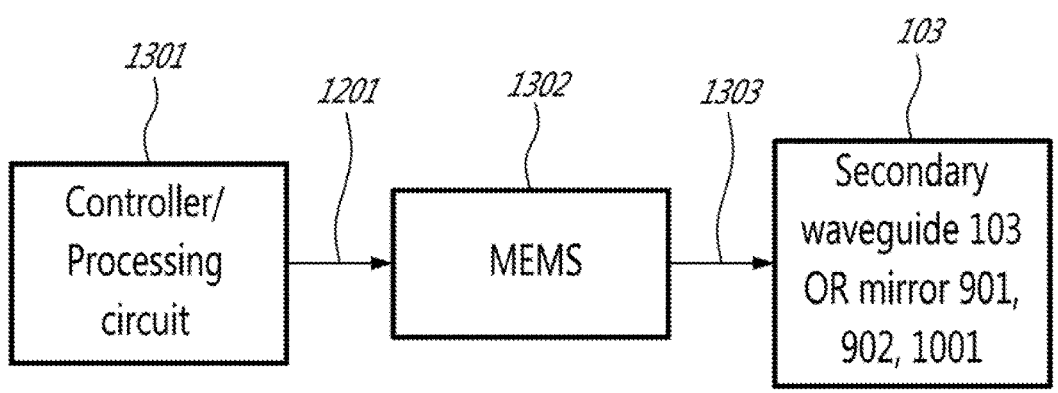
FIG. 13 is a schematic representation of hardware components that can be used to operate a tunable microring resonator.

FIGS. 12 and 13 illustrate a method and hardware components, such as a controller or processing circuit 1301, for operating a tunable microring resonator 100. The method comprises the step of sending a signal, 1201, to a Micro-Electro-Mechanical System (MEMS) 1302 to induce, by mechanical movement 1303, the optical coupling of at least a first end of a primary waveguide with a first end of a selected secondary waveguide 103, selected among a plurality of secondary waveguides each having a different length, such that light can circulate within the tunable microring resonator.

The mechanical movement may be a translation movement along a vertical or a horizontal axis that is applied to the plurality of secondary waveguides, to abut first 110 and second 111 ends of the primary waveguide 102 to respective first 112 and second 113 ends of the selected secondary waveguide 103.

The mechanical movement may alternatively be a rotation that is applied to a mirror 901, 902, 1001, to redirect the light coming from the first end 110 of the primary waveguide 102 towards the first end 112 of the selected secondary waveguide 103. The mirror may be concave.

The proposed structures can be used to make tunable WDM switches by controlling the I/O bus 101 to microring coupling via a p-n junction to inject free carriers or by thermal control of the effective index. The MEMS movable part converts this structure into a highly tunable WDM switch useful in optical communication networks to simultaneously switch a number of optical channels. Tunability of the switch means that channel spacing can vary in a WDM system and the switch can still operate by tuning to the new wavelengths.

In another application, the proposed structures can be used in optical frequency comb generation. The comb generated using the proposed structures will have a tunable FSR which can be used in flexible WDM systems that have varying wavelength spacing. Tunable frequency combs can be made by using the proposed structure inside a fiber cavity as a wavelength selective element. The cavity lases at the micro resonator resonances which are tunable by our proposed MEMS structure.

Another application is for tunable radio frequency (RF) tone generation. Beating of the frequency components in a comb can be used to generate RF tones. Two resonance frequencies of the ring are selected by using an optical band pass filter. The output of the band pass filter is sent to a photodetector to generate the RF beat note. The tunable FSR optical filter results in tunable RF sources.

The disclosed structures are not limited to silicon photonics and apply to other types of integrated optical circuits such as silicon-nitride waveguides. Low-loss silicon nitride waveguides can be chosen for large rings if small FSRs are required.

Modifications and other embodiments will come to mind to one skilled in the art having the benefit of the teachings presented in the foregoing description and the associated drawings. Therefore, it is to be understood that modifications and other embodiments, such as specific forms other than those of the embodiments described above, are intended to be included within the scope of this disclosure. The described embodiments are merely illustrative and should not be considered restrictive in any way. The scope sought is given by the appended claims, rather than the preceding description, and all variations and equivalents that fall within the range of the claims are intended to be embraced therein. Although specific terms may be employed herein, they are used in a generic and descriptive sense only and not for purposes of limitation.

The invention claimed is:

1. A tunable microring resonator, comprising:
a primary waveguide having first and second ends;
a plurality of secondary waveguides each having a different length and each having first and second ends; and
a Micro-Electro-Mechanical System (MEMS) adjustable to optically couple at least a first end of the primary waveguide with a first respective end of a selected secondary waveguide thereby allowing light to circulate within the tunable microring resonator.

2. The tunable microring resonator of claim 1, wherein the plurality of secondary waveguides are moved by the MEMS as a single element and wherein the MEMS optically couples the second end of the primary waveguide with a second respective end of the selected secondary waveguide.

3. The tunable microring resonator of claim 1, wherein the secondary waveguides are made of Si or $Si_3N_4$, in a $SiO_2$ or air cladding and are built on a substrate of $SiO_2$.

4. The tunable microring resonator of claim 1, wherein the secondary waveguides are laser inscribed inside a glass or polymer substrate.

5. The tunable microring resonator of claim 1, wherein the secondary waveguides are stacked on top of each other and are moved by the MEMS according to a translation movement along a vertical axis, wherein the first and second ends of the primary waveguide abut respective first and second ends of the selected secondary waveguides.

6. The tunable microring resonator of claim 1, wherein the secondary waveguides are spaced apart by spacers.

7. The tunable microring resonator of claim 1, wherein the secondary waveguides are intertwined and comprise at least one bridge.

8. The tunable microring resonator of claim 1, wherein the secondary waveguides are juxtaposed on a substrate and are moved by the MEMS according to a translation movement along a horizontal axis.

9. The tunable microring resonator of claim 8, wherein the secondary waveguides comprise a plurality of segments and a plurality of mirrors for reflecting light therein.

10. The tunable microring resonator of claim 1, wherein the secondary waveguides are juxtaposed inside a substrate and are moved by the MEMS according to a translation movement along a horizontal axis.

11. The tunable microring resonator of claim 10, wherein the secondary waveguides comprise a plurality of segments and a plurality of mirrors for reflecting light therein.

12. The tunable microring resonator of claim 1, wherein a second MEMS is adjustable to optically couples the second end of the primary waveguide with a second respective end of the selected secondary waveguide.

13. The tunable microring resonator of claim 12, wherein the MEMS are operative to rotate mirrors to redirect the light coming from the first end of the primary waveguide towards the first end of the selected secondary waveguide and to redirect the light coming from the second end of the selected secondary waveguide towards the second end of the primary waveguide.

14. The tunable microring resonator of claim 13, wherein the mirrors are concave.

15. The tunable microring resonator of claim 1, wherein the MEMS is adjustable to rotate a mirror to redirect the light coming from the first end of the primary waveguide towards the first end of the selected secondary waveguide and wherein the second end of the primary waveguide is edge coupled to the second end of the selected secondary waveguide in a fixed manner.

16. The tunable microring resonator of claim 15, wherein the first waveguide and one of the secondary waveguide form a single continuous waveguide located in-between other secondary waveguides.

17. The tunable microring resonator of claim 1, wherein the MEMS is adjustable to edge couple the first end of the primary waveguide to the first end of the selected secondary waveguide, wherein the first end of the primary waveguide abut the first end of the selected secondary waveguides, and wherein a fixed mirror is operative to redirect the light coming from the second end of the selected secondary waveguide towards the second end of the primary waveguide.

18. The tunable microring resonator of claim 1, comprising at least two secondary waveguides, each having a portion operative to overlap with a portion of another secondary waveguide, wherein at least one of the secondary waveguides is movable between a first position where it partially overlaps with the primary waveguide only and a second position where it partially overlaps with the primary waveguide and the other secondary waveguide.

19. A method of operating a tunable microring resonator, comprising sending a signal to a Micro-Electro-Mechanical System (MEMS) to induce, by mechanical movement, the optical coupling of at least a first end of a primary waveguide with a first end of a selected secondary waveguide, selected among a plurality of secondary waveguides each having a different length, such that light can circulate within the tunable microring resonator.

20. The method of claim 19, wherein the mechanical movement is a translation movement along a vertical or a horizontal axis that is applied to the plurality of secondary waveguides, to abut first and second ends of the primary waveguide to respective first and second ends of the selected secondary waveguide.

21. The method of claim 19, wherein the mechanical movement is a rotation that is applied to a mirror, to redirect the light coming from the first end of the primary waveguide towards the first end of the selected secondary waveguide.

22. The method of claim 21, wherein the mirror is concave.

* * * * *